United States Patent Office 2,898,219
Patented Aug. 4, 1959

2,898,219

IVORY, OPALESCENT GLASSES

James E. Duncan, Brackenridge, and Samuel L. Seymour, Oakmont, Pa., assignors to Pittsburgh Plate Glass Company, Allegheny County, Pa., a corporation of Pennsylvania No Drawing. Application June 27, 1957
Serial No. 668,290

7 Claims. (Cl. 106—52)

The present invention relates to opaque glasses and it has particular relation to novel compositions yielding opaque glasses having a pleasing ivory color. This application is a continuation-in-part of our copending application Serial No. 583,912, filed May 10, 1956, now abandoned.

Opaque glasses have found widespread adoption as a structural medium, particularly in the construction of storefronts, kitchens, bathrooms and the like. Production of these glasses in a range of colors has been very well standardized and even today, when material shortages have necessitated variations in batch compositions, most of the colors can be obtained by either the pot casting method or in continuous furnaces. These glasses are annealed according to conventional practices and are polished on at least one surface in accordance with conventional, polished plate glass practices. The following U.S. patents describe some of these glasses: 1,956,176 (cream), 2,224,469 (opal base), 2,237,042 (red or pink), 2,282,601 (ivory), 2,394,502 (white), 2,599,349 (green), 2,683,666 (ivory) and 2,776,900 (tan).

Difficulty has been experienced, however, in compounding an opaque glass having an ivory color which is satisfactory to the trade. It is well known that an ivory, opaque glass can be made with fluorine, uranium and selenium as the colorants. The importance of the use of uranium in other fields has restricted its use for glass making to the extent that it is not available.

It is an object of the present invention to provide an ivory, opaque glass having definite radiant energy reflectance values and which may be manufactured by conventional pot casting or continuous plate glass manufacturing procedures.

Another object of this invention is the provision of an ivory, opaque glass which does not require the use of uranium as a colorant. It is well known to the art that chromium oxide in a glass produces a green color and that selenium produces a pink color. We have discovered that a pleasing ivory colored, opaque glass is produced when the proper proportions of chromium oxide and selenium are employed in glasses composed of 60 to 75 percent $SiO_2$, 5 to 18 percent $Na_2O$, 0 to 10 percent $K_2O$, 0 to 10 percent CaO, 0 to 12 percent ZnO, 0 to 12 percent BaO, 2 to 12 percent $Al_2O_3$, 0 to 2 percent $As_2O_5$, 1 to 7 percent F and 0 to 5 percent $TiO_2$.

In accordance with the present invention, readily reproducible ivory, opaque glasses are provided. These glasses contain as the essential coloring ingredients 1 to 7 percent by weight fluorine, 0.005 to 0.1 percent by weight chromium oxide, and 0.01 to 0.2 percent by weight selenium. Calculated compositions of some glasses which are within the purview of the present invention are set forth in the table below. These glasses can be made from conventional glass forming compounds.

The oxygen equivalent of fluorine is set forth in the table because of the manner of calculating the composition of the glass. The fluorine shown in the composition in the tables is understood to be present in the glasses in some combined form but not as a gas. It is not known exactly how this fluorine is combined, but it is probably combined as a fluoride such as NaF, KF or $CaF_2$.

In an analysis of a glass, it is customary to analyze only for the elements and then list the presence of these elements in the glass as oxides. In cases where some fluorine is present in a glass, it is probably present as a fluoride compound with a cation in the glass and thus replaces a stoichiometric equivalent of oxygen with this cation. Thus, it is convenient to show the amount of fluorine in percent by weight as fluorine and then subtract from the sum total percentages of the glass composition based on oxides, its stoichiometric equivalent of oxide in percent by weight.

Silica is the principal glass former. A range of $SiO_2$ between 60 to 75 percent by weight is preferred. The durability of a glass containing less than 60 percent by weight $SiO_2$ is poor and it is difficult to melt a glass containing over 75 percent by weight $SiO_2$. There is also a tendency for glass containing more than the desired maximum of $SiO_2$ to devitrify.

The alkali metal oxides, $Na_2O$ and $K_2O$, are the principal fluxes. $Li_2O$ may be used to replace part of the $Na_2O$ and $K_2O$, however, this material increases the cost of the batch. It is preferred that the total weight of alkali metal oxides in the glasses of the present invention be within 13 to 21 percent by weight of the glasses. Glasses having below 13 percent by weight alkali metal oxides are difficult to melt. The glasses have poor durability when the total alkali metal oxides content exceeds 21 percent by weight.

The alumina increases the working range of the glasses. If more than 12 percent by weight $Al_2O_3$ is included in the glasses, an excessive amount of alkali metal oxides and fluorine is required to compensate for the stiffness imparted to the glasses by the alumina. The glasses have too narrow a working range if less than 2 percent by weight of $Al_2O_3$ is employed.

Up to 10 percent by weight of CaO may be included in the glasses. CaO tends to produce smaller fluoride crystals. For glasses wherein an opacity with smaller fluoride crystals is desired, a high percentage of fluorine is required. Glasses containing above 10 percent by weight CaO require an extremely high percentage of fluorine. Where the maximum opacity with the minimum amount of fluorine is desired, the glasses should be substantially free from CaO.

Other bivalent metal oxides such as ZnO and BaO may be employed. When such bivalent metal oxides are used, the maximum total weight of the bivalent metal oxides in the glass should not be greater than 12 percent by weight of the glass.

A small amount of $TiO_2$ may be employed without causing any detrimental effect. Arsenic oxide is employed as a refining agent. Other refining agents may

Table

| Ingredients | 1 | 2 | 3 | 4 | 5 | 6 | 7 |
|---|---|---|---|---|---|---|---|
| $SiO_2$ | 70.4 | 70.1 | 71.0 | 68.2 | 68.2 | 69.6 | 69.6 |
| $Na_2O$ | 14.9 | 15.0 | 14.9 | 14.4 | 14.4 | 14.9 | 14.7 |
| $K_2O$ | 2.0 | 2.0 | 2.0 | 1.9 | 1.9 | 0.7 | 2.0 |
| CaO | 0.6 | 0.6 | | 0.7 | 0.7 | 6.0 | 0.7 |
| ZnO | | | | | 3.4 | 1.7 | |
| BaO | | | | | | 3.4 | |
| $Al_2O_3$ | 9.6 | 9.5 | 9.6 | 8.8 | 8.8 | 3.2 | 9.0 |
| $As_2O_5$ | 0.9 | 0.9 | 0.9 | 0.8 | 0.8 | 1.0 | 0.9 |
| F | 2.7 | 3.0 | 2.7 | 3.0 | 3.0 | 5.0 | 2.9 |
| $TiO_2$ | | | | | | | 1.4 |
| $Cr_2O_3$ | 0.02 | 0.05 | 0.02 | 0.01 | 0.01 | 0.02 | 0.02 |
| Se | 0.06 | 0.12 | 0.06 | 0.03 | 0.03 | 0.04 | 0.06 |
| Oxygen equivalent of fluorine | −1.2 | −1.3 | −1.2 | −1.3 | −1.3 | −2.1 | −1.3 | be used singly or in combination providing that they do not affect the reflectance and color properties of the glasses.

Fluorine is used as an opacifying agent. It also acts as a flux and a colorant. The amount of white or opacity has a very great effect on the intensity of the ivory color. It is preferred to have between 2.5 and 3.0 percent by weight F in the glasses, although as high as 7 percent or as low as 1 percent by weight may be used, depending upon the percentages of the other constituents, the degree of annealing and the intensity of the color required. If too much fluorine is included, the glasses will opacify too rapidly, thereby forming dense, opaque glasses having a lighter color than that desired. If too little fluorine is employed in combination with the other colorants, colored glasses having a milky or translucent appearance are produced instead of glasses having the desired opacity.

Selenium and chromium oxides are the colorants employed in combination with fluorine to produce the ivory, opaque glasses. Only small amounts of these colorants are required. The amount of selenium may vary from 0.01 to 0.2 percent by weight and the amount of chromium oxide may vary from 0.005 to 0.1 percent by weight. The balance between the fluorine and the coloring agents is necessitated by the manner in which the glasses are formed.

The glasses of the invention may be produced from conventional glass making materials properly compounded and thoroughly mixed so as to yield, when reacted, glasses of the desired ultimate composition. Suitable batch materials include sand, soda ash, potassium carbonate, sodium nitrate, arsenious oxide, nepheline syenite, feldspar, sodium silico fluoride, fluorspar, zinc oxide, barium carbonate, titanium dioxide, chromium oxide and selenium metal.

Various size pots or crucibles may be employed and the melting temperatures and times will vary according to the amount being formed. The temperatures and melting conditions herein recited may be employed to make 8 pounds of glass in a refractory pot in a furnace heated by the controlled combustion of natural gas.

An empty pot is preheated in the furnace at a furnace temperature of about 2200° F. A portion of the mixed batch is ladled into the preheated pot and the furnace temperature is gradually increased until it reaches approximately 2500° F. in one hour at which time a second charge of the remaining batch is added to the pot. The pot and its contents are heated for an additional hour and a half and the furnace temperature is gradually increased to 2650° F. At the end of this time, the glass is formed in a molten condition. The molten glass is then held at a furnace temperature of 2650° F. for one and one-half hours to permit the conclusion of the chemical reactions, the exclusion of gases and the substantial homogenization of the glass. It is desired that the glass be produced under neutral to slightly oxidizing conditions in the melting furnace or container.

The refined glass is cooled to approximately 2200° F. and the pot is removed from the furnace. The contents of the pot are poured on a cast iron table where the glass is rolled in the form of a plate. The plate is placed in a kiln and cooled from a temperature of about 1050° F. to about 850° F. at a rate of about 4° F. per minute. During this cooling operation, the glass is annealed, the fluoride crystals are formed and the color develops as a result of using a combination of the proper proportions of fluorine and the other colorants. After cooling, the glass may be ground and polished.

The glasses set forth above have colors which may be described as having certain radiant energy reflectance values over the visible portion of the spectrum. The glasses of the present invention have radiant energy reflectance values of from 23 to 43 percent at 400 millimicrons, 26 to 46 percent at 450 millimicrons, 31 to 51 percent at 500 millimicrons, 40 to 60 percent at 550 millimicrons, 45 to 65 percent at 600 and 650 millimicrons, and 48 to 68 percent at 700 millimicrons.

The reflectance values of the glass set forth in column 1 of the table above are set forth below to illustrate a glass having reflectance properties within the specified ranges. These reflectance values are relative to pure magnesium oxide.

| Wavelength (MMu) | Percent reflectance |
| --- | --- |
| 400 | 32.9 |
| 420 | 33.7 |
| 440 | 34.6 |
| 460 | 36.2 |
| 480 | 38.4 |
| 500 | 41.2 |
| 520 | 44.8 |
| 540 | 48.2 |
| 560 | 51.4 |
| 580 | 53.6 |
| 600 | 54.3 |
| 620 | 53.7 |
| 640 | 53.8 |
| 660 | 53.9 |
| 680 | 55.1 |
| 700 | 56.4 |
| 720 | 59.1 |
| 740 | 61.9 |
| 750 | 63.2 |

Although the present invention has been described with respect to specific details of certain embodiments thereof, it is not intended that such details be limitations upon the scope of the invention except insofar as set forth in the following claims:

We claim:

1. An ivory, opaque glass consisting essentially of the following ingredients in percent by weight: 60 to 75 percent $SiO_2$, 13 to 21 percent alkali metal oxides selected from the group consisting of 5 to 18 percent $Na_2O$ and 0 to 10 percent $K_2O$, 2 to 12 percent $Al_2O_3$, 0 to 10 percent CaO, 0 to 12 percent ZnO, and 0 to 12 percent BaO, the sum of the bivalent metal oxides being not greater than 12 percent when present, 0 to 2 percent $As_2O_5$, 0 to 5 percent $TiO_2$, 1 to 7 percent F, 0.005 to 0.1 percent chromium oxide and 0.01 to 0.2 percent selenium.

2. An ivory, opaque glass as defined in claim 1, said glass having radiant energy reflectance values relative to pure magnesium oxide of from 23 to 43 percent at 400 millimicrons, 26 to 46 percent at 450 millimicrons, 31 to 51 percent at 500 millimicrons, 40 to 60 percent at 550 millimicrons, 45 to 65 percent at 600 millimicrons and at 650 millimicrons, and 48 to 68 percent at 700 millimicrons.

3. A glass having substantially the following composition wherein the ingredients are set forth in percent by weight: 70.4 percent $SiO_2$, 14.9 percent $Na_2O$, 2.0 percent $K_2O$, 0.6 percent CaO, 9.6 percent $Al_2O_3$, 0.9 percent $As_2O_5$, 2.7 percent F, 0.02 percent $Cr_2O_3$, and 0.06 percent Se, the total exceeding 100 percent by an amount of oxygen stoichiometrically equivalent to the amount of fluorine present.

4. A glass having substantially the following composition wherein the ingredients are set forth in percent by weight: 70.1 percent $SiO_2$, 15.0 percent $Na_2O$, 2.0 percent $K_2O$, 0.6 percent CaO, 9.5 percent $Al_2O_3$, 0.9 percent $As_2O_5$, 3.0 percent F, 0.05 percent $Cr_2O_3$, and 0.12 percent Se, the total exceeding 100 percent by an amount of oxygen stoichiometrically equivalent to the amount of fluorine present.

5. A glass having substantially the following composition wherein the ingredients are set forth in percent by weight: 71.0 percent $SiO_2$, 14.9 percent $Na_2O$, 2.0 percent $K_2O$, 9.6 percent $Al_2O_3$, 0.9 percent $As_2O_5$, 2.7 percent F, 0.02 percent Cr$_2$O$_3$, and 0.06 percent Se, the total exceeding 100 percent by an amount of oxygen stoichiometrically equivalent to the amount of fluorine present.

6. A glass having substantially the following composition wherein the ingredients are set forth in percent by weight: 68.2 percent SiO$_2$, 14.4 percent Na$_2$O, 1.9 percent K$_2$O, 0.7 percent CaO, 3.4 percent ZnO, 8.8 percent Al$_2$O$_3$, 0.8 percent As$_2$O$_5$, 3.0 percent F, 0.01 percent Cr$_2$O$_3$, and 0.03 percent Se, the total exceeding 100 percent by an amount of oxygen stoichiometrically equivalent to the amount of fluorine present.

7. A glass having substantially the following composition wherein the ingredients are set forth in percent by weight: 68.2 percent SiO$_2$, 14.4 percent Na$_2$O, 1.9 percent K$_2$O, 0.7 percent CaO, 3.4 percent BaO, 8.8 percent Al$_2$O$_3$, 0.8 percent As$_2$O$_5$, 3.0 percent F, 0.01 percent Cr$_2$O$_3$, and 0.03 percent Se, the total exceeding 100 percent by an amount of oxygen stoichiometrically equivalent to the amount of fluorine present.

References Cited in the file of this patent

UNITED STATES PATENTS

| 2,360,280 | Rolph et al. | Oct. 10, 1944 |
| 2,416,392 | Hood | Feb. 25, 1947 |
| 2,683,666 | Duncan et al. | July 13, 1954 |

OTHER REFERENCES

Tooley: Handbook of Glass Manufacture, 1953, Ogden Pub. Co., pp. 72–75.

Glastechnische Tabellen, Eitel-Pirani-Scheel, 1932 ed., page 657.